United States Patent
Boshev et al.

(10) Patent No.: US 9,665,416 B1
(45) Date of Patent: May 30, 2017

(54) ASYNCHRONOUS EXECUTION OF COMPUTER OPERATIONS

(71) Applicant: SAP SE, Walldorf (DE)

(72) Inventors: Stoyan Boshev, Sofia (BG); Chavdar Baikov, Sofia (BG); Tsvetan Stoyanov, Sofia (BG); Petio Petev, Sofia (BG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/139,297

(22) Filed: Apr. 26, 2016

(51) Int. Cl.
*G06F 13/00* (2006.01)
*G06F 9/54* (2006.01)

(52) U.S. Cl.
CPC .................... *G06F 9/546* (2013.01)

(58) Field of Classification Search
CPC ........................................ G06F 9/546
USPC ......................................... 719/313
See application file for complete search history.

(56) References Cited

U.S. PATENT DOCUMENTS

| | | | | |
|---|---|---|---|---|
| 7,603,476 B1* | 10/2009 | Hofmann | ............... | G06F 9/546 709/232 |
| 2015/0347207 A1* | 12/2015 | Shafi | ..................... | G06Q 30/06 719/313 |

* cited by examiner

*Primary Examiner* — Andy Ho

(57) ABSTRACT

An operation execution request is created by an operation requester at an operations service module. The operation execution request is stored by the operations service module. A polling message for the operation execution request is received. The polling message includes a name of an operation. A response including the operation execution request and corresponding operation data is returned. An execution service schedules internally the operation for execution. The execution service sends an acknowledgement message to acknowledge the operation execution request. The operation data and corresponding operation execution request is locked for execution by other execution services. The execution service executes the operation with the operation data and provides result of the operation execution. The operations service module updates status of the operation execution request. The updated status is provided to the operation requester upon polling for status of the operation execution request.

20 Claims, 6 Drawing Sheets

ASYNCHRONOUS EXECUTION OF COMPUTER OPERATIONS

FIELD

Embodiments described herein relate to digital data processing systems and corresponding data processing methods for exchanging data between executing computer programs or processes. Further, tools and techniques that allow application programs to utilize an operating system and to facilitate requests to lower-level operating system routines are described.

BACKGROUND

Application programming interfaces provide building blocks for computer programs. Typically, an application programming interface (API) is developed for a specific programming language. Such an API may describe operations, inputs, outputs, and underlying types of a program that is part of a system or is deployed on a platform developed in the programming language. For example, a program developed in Java® may use a Java API to interact with system hardware, e.g., hardware layer of a cloud platform. An API may include various specifications such as routines, data structures, object classes, and variables of a program. An API may specify how operations are executed within a program. For example, in accordance with API specification, point-to-point connectivity might be required between operation requester and operation executor to perform synchronous execution of an operation. Thus, operation requester and operation executor are coupled together which introduces complexity in a program landscape. Moreover, thread blocking and unexpected interruptions may occur during execution of the operation.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for asynchronous execution of computer operations are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
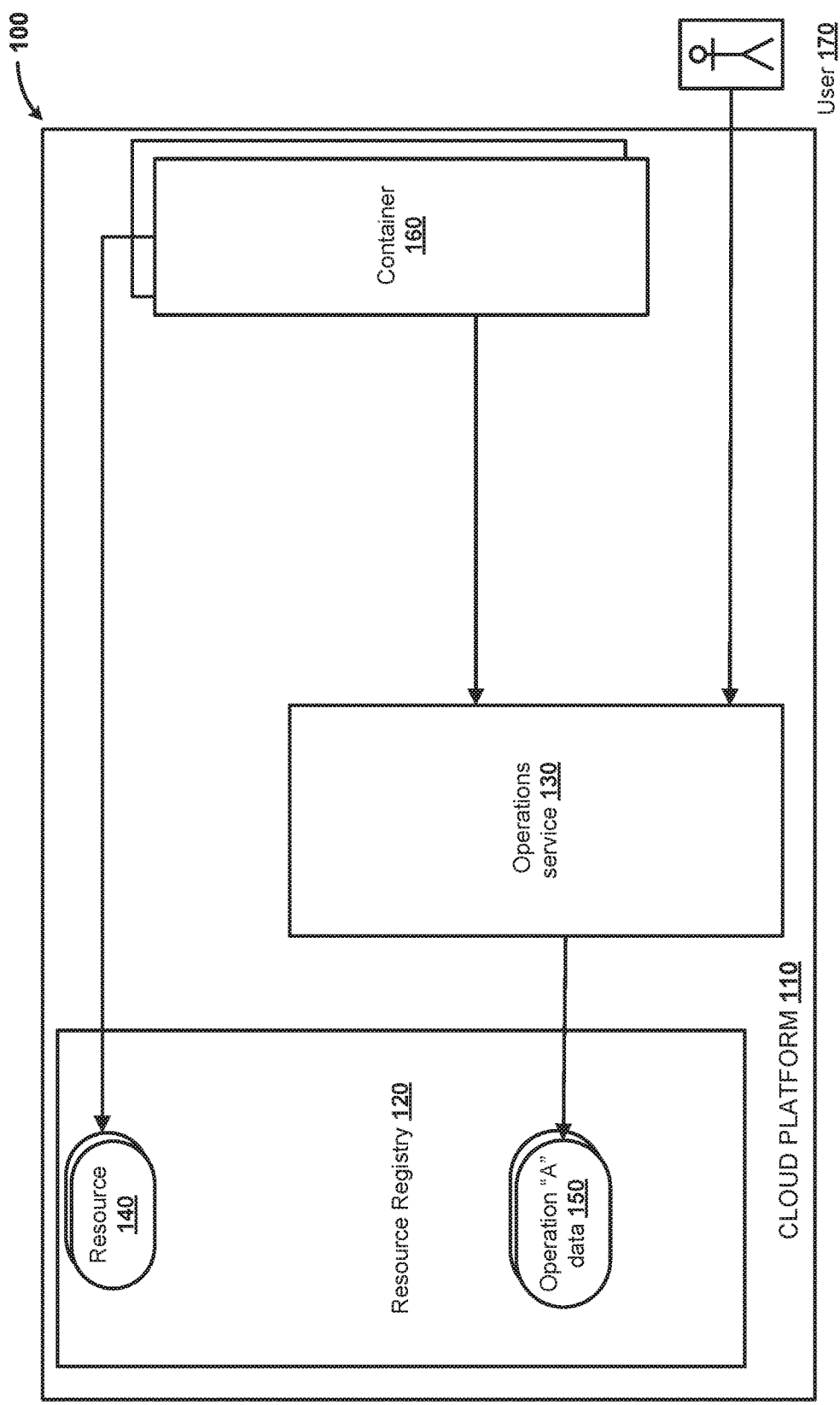
FIG. 1 is a block diagram illustrating an architecture to execute operations through an operations service module, according to one embodiment.

FIG. 1 is a block diagram illustrating system architecture 100 for executing operations through an operations service module, according to one embodiment. Architecture 100 includes cloud platform 110.

Cloud platform 110 can be viewed as containing a hardware layer and an abstraction layer. The hardware layer may consist of hardware resources to support cloud services being provided, and may include, among others, a server, a storage unit and network components. The abstraction layer may include software that is deployed across the hardware layer and manifests functionalities provided by cloud platform 110. For example, cloud platform 110 may provide application runtime functionalities, user interface (UI) development toolkits, internal configurations, cloud services such as connectivity service, persistence service, identity service, feedback service, document service, etc.

The functionality provided by cloud platform 110 can be utilized by customers of cloud platform 110 to develop and/or deploy software applications on cloud platform 110. In one embodiment, software applications may be developed via functionality provided at cloud platform 110.

In one embodiment, cloud platform 110 may also provide support for application lifecycle processes, for example, deployment, installation, provisioning and maintenance of applications that may be built, deployed, installed and run on cloud platform 110.

In one embodiment, cloud platform 110 is a platform-as-a-service that provides environment for application deployment together with a number of integrated services. One or more of the integrated services may be provided to customers of cloud platform 110 via APIs. In one embodiment, the APIs are utilized for communication between the application runtime functionalities of cloud platform 110. A container may represent an application runtime environment. For example, a monitoring API may provide a monitoring service enabling customers of cloud platform 110 to fetch monitoring status and detailed metric values for an application.

Similarly, an operations service 130 for requesting execution of operations and providing operation execution status via a feedback mechanism is provided through an API. Such service may receive requests for execution of operations. Operations service 130 may send the requests to containers that are configured to execute certain operations. Additionally, operations service 130 may provide status of the operation execution both during and upon execution of the operation by the container.

In one embodiment, user 170 invokes operations service 130 to create a request for execution of an operation. For example, the operation may include an action to be performed over a system or an application. Examples for an action may include, but are not limited to, discovery and registration of specific entities, performing a step of a multi-step configuration process, providing and importing business roles and content in a target system, etc. In one embodiment, execution of operation "A" is requested. For example, operation "A" may be an operation to import user roles in a web server.

User 170 may create operation execution request through a number of tools such as a command line interface (CLI), a web interface, an integrated development environment (IDE), etc. For example, user 170 creates the execution request for operation "A" by executing a command in a CLI. A request for execution of the operation is created by providing operation data. In one embodiment, the operation execution request may be created by an automated service. For example, an installation script or an application may provide operation data and create the request. An entity that creates operation execution requests in operations service 130 and requires status of the execution of the operation from operations service 130 may be viewed as an operation requester.

In one embodiment, an operation execution request is created by calling operations service 130 and specifying, data for the requested operation, including a name of the operation. For example, user 170 may create a request for execution of an import roles operation named "import roles". Other parameters included in the data may be an execution service, a timeout value, an account, etc. Upon creation of the request, the data provided with the request is stored in a resource registry 120 via operations service 130 (e.g., operation "A" data 150). In one embodiment, operation "A" data 150 might be stored in a repository or other generic storage device that is connected to operations service module 130.

When the operation execution request is created, the operation requester requests a status from the execution of operation "A", according to one embodiment. Further, when execution of the operation is completed, operations service 130 provides the status from the execution of operation "A" to the operation requester (e.g., user 170).

Operations service 130 receives a polling message from container 160 to provide an operation execution request including operation data. Container 160 sends the polling message to operations service 130 when resources to process a request for execution of operation "A" are available in container 160. In one embodiment, a processor thread of container may be available to process the operation execution request. For example, container 160 may request data of another operation execution request upon completion of a current request for execution of operation "A".

In one embodiment, container 160 specifies a name of the operation in the operation execution request to operations service 130. For example, container 160 sends a polling message to operations service 130 to ask for data from an operation execution request. Container 160 includes the name of operation "A" in the polling message, i.e. "import roles". Operations service 130 receives the polling message from container 160 and checks for data with a matching operation name in resource registry 120. Although the above-described embodiment includes an operation data polling message with a single operation name specified, some embodiments might include a polling message for operation data that includes additional parameters. Thus, container 160 may ask for data from multiple operation execution requests by defining in the polling message one or more additional parameters in addition to the operation name. Operations service 130 may filter data from one or more operation execution requests based on the additional parameters. For example, an execution time parameter may be specified in the polling message. In such case, operations service 130 may filter data from the one or more requests based on the execution time parameter.

Upon receiving the polling message to provide an operation execution request and the corresponding operation data from container 160, operations service 130 identifies the operation execution request and sends the operation execution request to container 160. In one embodiment, operations service 130 sends operation "A" data 150 to container 160. In one embodiment, operations service 130 determines that operation "A" data 150 includes an operation name matching the "import roles" operation name value that is included in the polling message from container 160. Therefore, operations service 130 sends a response to the polling message. The response includes operation "A" data 150.

A container may be viewed as an execution service or an application that is configured to execute one or more operations. For example, container 160 may be configured to execute operation "A" that is named "import roles". Container 160 may be a virtual environment for execution of operations such as operation "A". In one embodiment, the container is designed to process one request for execution of operation "A" at a time.

Container 160 may incorporate an application runtime environment that is provided by cloud platform 110. Container 160 implements source code of operation "A", according to one embodiment. For example, the request for execution of operation "A" that includes operation "A" data 150 may be processed by an execution service (e.g., container 160) in order to import new roles in a web server. When provided with operation "A" data 150, container 160 schedules internally operation "A" for execution. Further, container 160 determines an expected execution time for operation "A". For example, operation "A" to import one or more business roles may be scheduled for execution within two seconds time.

Upon sending operation "A" data 150, an acknowledgement message is received at operations service 130. The acknowledgement message is sent from container 160. Since containers, such as container 160, may have more than one instance that process simultaneously execution requests of operation "A" with different data, a mechanism is established to guarantee that operation "A" is idempotent. The mechanism guarantees that operation "A" is executed once at the most with operation "A" data 150. Respectively, the operation execution request corresponding to operation "A" data 150 is processed at most once.

Upon receiving the acknowledgement message from container 160, API 130 locks operation "A" data 150 from execution by other execution services. Thus, the operation request corresponding to operation "A" data 150 cannot be acknowledged and executed by other execution services.

Further, container 160 includes an "execution time" parameter in the acknowledgement message to operations service 130, according to one embodiment. Operations service 130 extracts the "execution time" parameter from the acknowledgement message. Thus, operations service 130 provides information to operation requester on when the status from execution of operation with operation "A" data 150 is expected. In addition, via the "execution time" parameter, operations service 130 monitors status of operation execution requests and removes operation execution requests that are acknowledged but remain unprocessed upon expiration of the expected execution time. In one embodiment, status of such operation execution request is set to "processing_timeout" to specify that the execution time specified in the acknowledgement message is expired and no status is received from the execution service.

In one embodiment, the operation requester and the execution service operate asynchronously to each other. That is operation requester (e.g., user 170) creates operation execution requests in operations service 130 and requests status from the execution of the operation requests. Execution service (e.g., container 160) requests, independently of operation requester, data for an operation from operations service 130 whenever the execution service has available resources to execute the operation with the received operation data. Operations service 130 module stores data for operations that is received as part of operation execution requests. Further, operations service 130 sends the operations data to the execution services upon receiving a polling message. Thus, the operation requester and the execution service are decoupled and the program landscape is simplified.

In one embodiment, the operation requester provides an acknowledgement time parameter when the operation execution request is created. The time parameter specifies a maximum time for acknowledgement of the operation execution request. For example, user 170 may include a time parameter with value "1800" to specify that an acknowledgement message must be received for the request corresponding to operation "A" data 150 within 1800 seconds (30 minutes). When an acknowledgement message is not received within the time specified for acknowledgment message, the status of the operation execution request is set to "ack_timeout" to specify that the operation execution request was not acknowledged in the timeout specified by the acknowledgement time parameter. In one embodiment, when the acknowledgement message is not received and the timeout specified for acknowledgement message has not expired, the status of the operation execution request may remain "initial" to specify that the operation execution request is yet to be acknowledged. In one embodiment, operations service 130 may identify an operation execution request based on the status of the operation execution request, in addition to the name of the operation. For example, operations service 130 may send an operation execution request to container 160 when the status of the operation execution request is set to "initial".

In addition to described operation request lifecycle statuses "initial", "ack_timeout" and "processing_timeout", operations service 130 maintains a "success" status and an "error" status, according to one embodiment. An operation execution request status is set to "success", when container 160 processes the operation execution request and sends feedback with status of the execution reported as successful. In contrast, when the operation execution request is processed by container 160 and the status from the execution is reported as error, operations service 130 sets the status of the operation execution request to "error". Thus, the operation requester receives real time status information for each operation execution request that is created at operations service 130.

In one embodiment, container 160 requests additional resources from resource registry 120 during execution of the operation execution request that corresponds to operation "A" data 150. For example, container 160 requests resource 140. Additional resources necessary for execution of each operation execution request, if any, are included in operation "A" data 150 by the operation requester. Operation "A" data 150 may include metadata of binary files. The binary files metadata may specify an endpoint where the binary files are located. Operation "A" data 150 may also include the binary files. For example, operation "A" data 150 may include a parameter "resourceTarget": "sfroles.zip" to specify additional resource file name ("sfroles.zip") and a parameter "resourceRepository": "jpaas.repo" to specify where the additional resource is stored ("jpaas.repo"). In one embodiment, the binary files necessary for execution of operation "A" are located at an entity that is different from resource registry 120. For example, the binary files may be located at a repository that is connected to container 160 or is part of cloud platform 110.

In one embodiment, container 160 may request data of an operation execution request from operations service 130 via a long polling mechanism. Long polling may be viewed as a request-response mechanism for long-running polling messages that improves operations service 130 availability. When data of a specific operation that is requested is unavailable, operations service 130 includes the long polling message in a pool of long polling messages for later asynchronous processing. The connection with the execution service that sent the long polling message remains open and is blocked waiting for response. As soon as data of the requested operation becomes available, operations service 130 responds to the long polling message with the available operation data. Thus, resources that process incoming polling messages are released and available to process other incoming polling messages. Furthermore, instant processing of created operation execution requests is enabled because of the pool of long polling messages waiting for response. Operations service 130 may be configured to hold incoming long polling messages for a predefined amount of time waiting for an appropriate operation execution request to be created. For example, polling messages may be stored in the pool for one minute. When an execution request for an appropriate operation is not created within the predefined amount of time, an empty response is returned to container 160, according to one embodiment.

Figure 2:
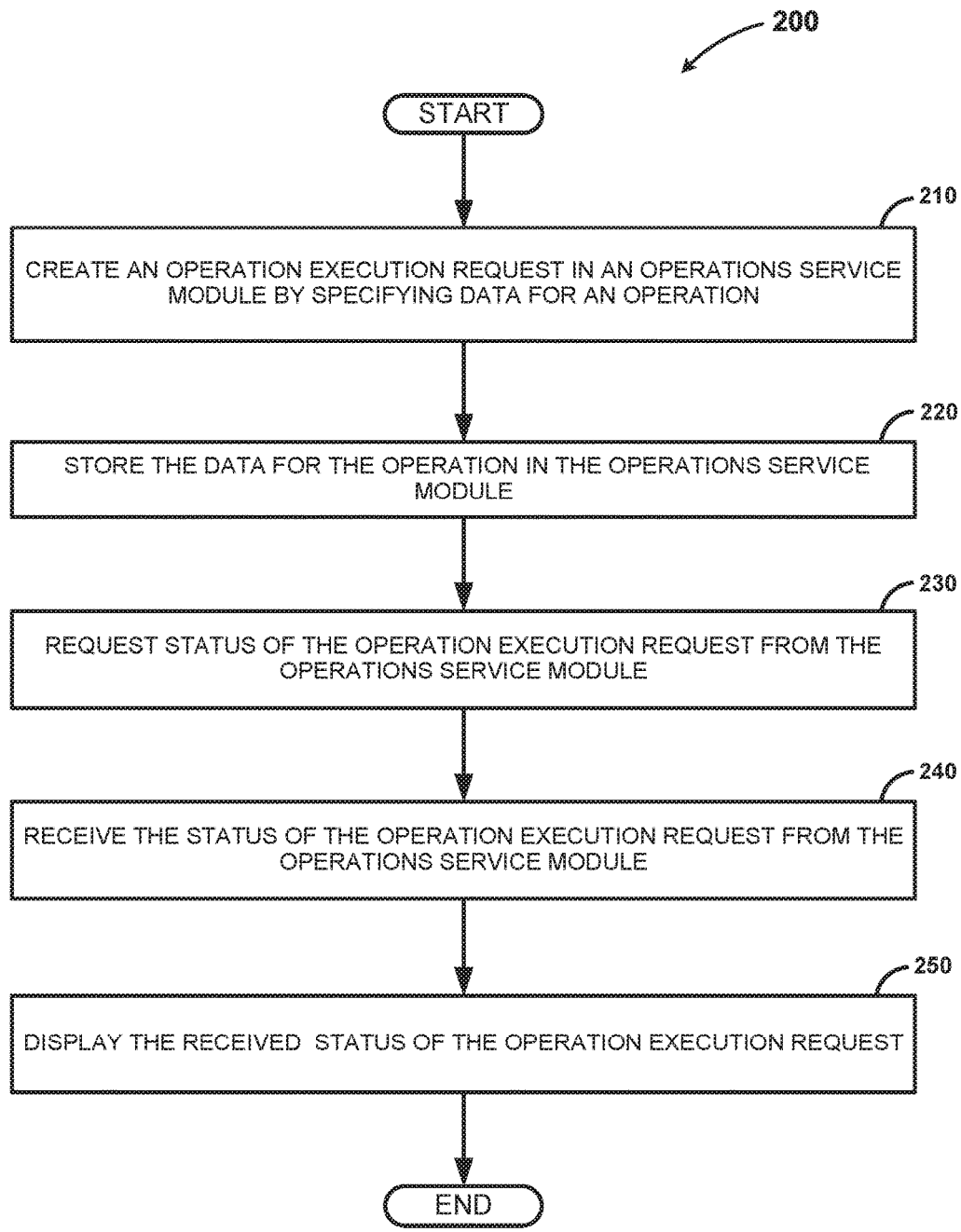
FIG. 2 is a flow diagram illustrating a process to create a request for execution of an operation, according to one embodiment.

FIG. 2 is a flow diagram illustrating a process 200 to create a request for execution of an operation, according to one embodiment. At 210, the operation execution request is created in an operations service module. The operation execution request may be created by executing a command. The operation execution request is created by an operation requester that invokes the operations service module 130 described with reference to FIG. 1. The operation requester specifies data of an operation in the operation execution request, according to one embodiment. In various embodiments, the operation requester may be a user that manually creates the operation execution request via a number of tools including a command line interface (CLI), a web interface, an integrated development environment (IDE), etc. The operation requester may also be a program that is configured to create operation execution requests. For example, the operation requester may be an installation script or an application that provides data of operations when creating the operation execution requests and requests execution status both during and upon execution of the requested operations.

In one embodiment, the operation requester provides an acknowledgement time parameter when the operation execution request is created. The time parameter specifics a maximum period for acknowledgement of the operation execution request. For example, the operation requester may include a time parameter with value "1800" to specify that an acknowledgement message must be received within 1800 seconds (30 minutes). When an acknowledgement message is not received within the time specified for acknowledgment message, status of the operation execution request states that the request was not acknowledged in the period specified by the acknowledgement time parameter.

Table 1 shows a sample of a such a request for execution of an operation:

TABLE 1

Create an operation execution request

```
POST /operations
Request:
{
    "name": "import_SFSF_roles",
    "target": "extensions.service",
    "timeout": "600",
    "account": "acc1",
    "parameters": {
        "resourceTarget": "sfroles.zip",
        "resourceRepository": "jpaas.repo"
    }
}
Response:
{
    "metadata": {
        "id": "1234",
        "createdAt": "1414077104039",
        "updatedAt": "1414077104039",
        "createdBy": "i0999999",
        "status": "INITIAL"
    },
    "name: "import_SFSF_roles",
    "target": "extensions.service",
    "timeout": "600",
    "account": "acc1",
    "parameters": {
        "resourceTarget": "sfroles.zip",
        "resourceRepository": "jpaas.repo"
    }
}
```

Process 200 to create an operation execution request continues at 220, where the operations service module stores data from the operation execution request. In one embodiment, the operations service module may store the data as a database table in a resource registry module. In one embodiment, the data from the operation execution request may be stored in a repository or a genetic storage module that is connected to the operations service module.

At 230, the operation requester requests status of the operation execution request. At 240, status of the execution request is received from the operations service module. Process 200 ends at 250, where the received status of the operation execution request is displayed.

Table 2 shows a sample of such a request for status of the operation execution request:

TABLE 2

Read status of an operation execution request

```
Request:
GET /operations/1234?knownStatus=PROCESSING
Response (when current status differs PROCESSING or when it changes):
{
    "metadata": {
        "id": "1234",
        "createdAt": "1414077104039",
        "updatedAt": "141407715436",
        "createdBy": "i0999999",
        "status": "SUCCESS",
        "processor": "extension.service",
        "ackTimeout": "600",
        "result": {
            "app": "webapp1",
            "url": "https://myapp.neo.ondemand.com/mywidget"
```

TABLE 2-continued

Read status of an operation execution request

```
        }
    },
    "name": "import_SFSF_roles",
    "target": "extensions.service",
    "timeout": "600",
    "account": acc1",
    "parameters": {
        "resourceTarget": "sfroles.zip",
        "resourceRepository": "jpaas.repo"
    }
}
```

In one embodiment, steps 230-250 of process 200 may be performed one or more times during execution of the operation specified in the operation execution request, thus providing real time information for the execution status of the requested operation.

Figure 3:
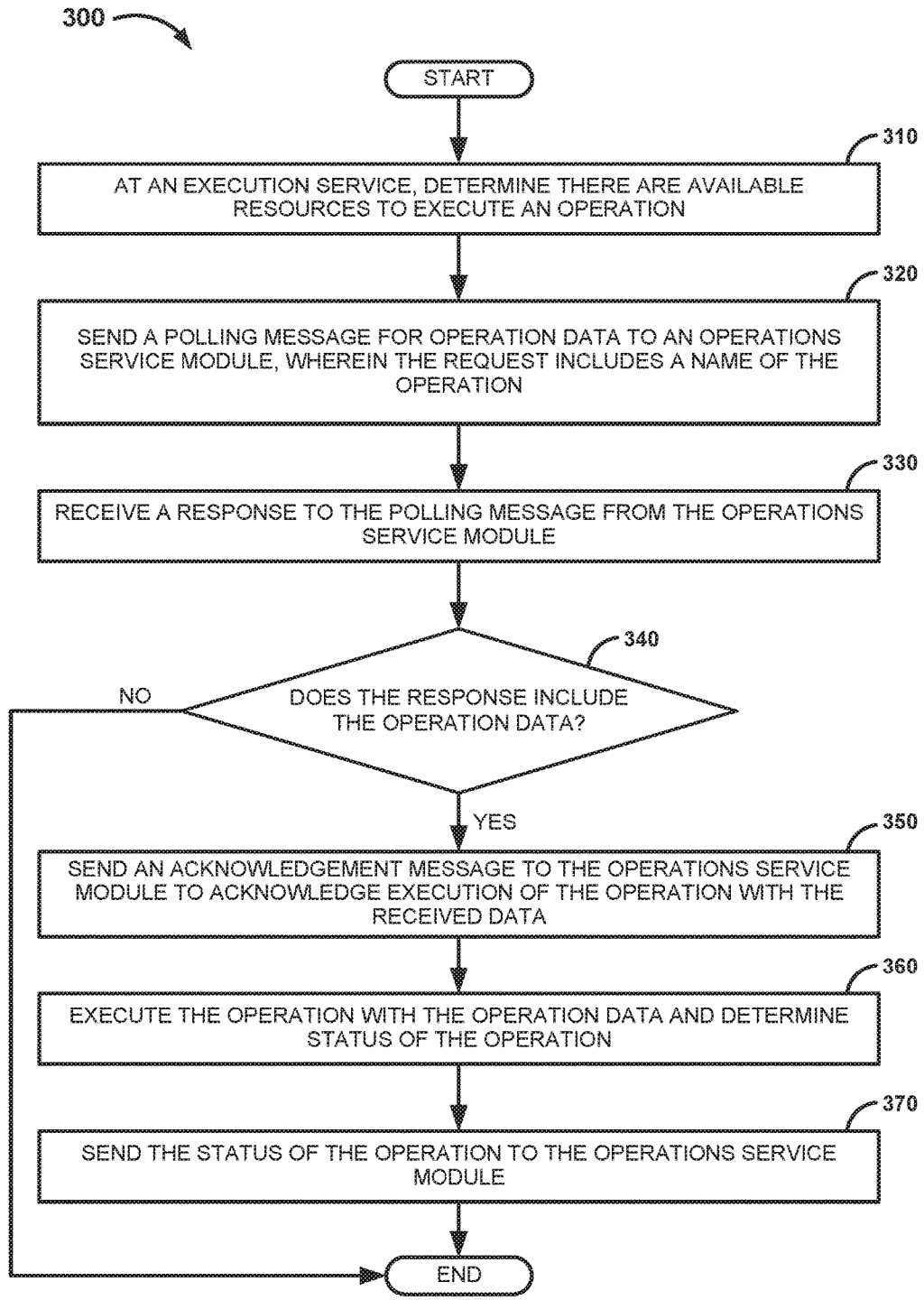
FIG. 3 is a flow diagram illustrating a process to request data of an operation, according to one embodiment.

FIG. 3 is a flow diagram illustrating a process 300 to request data of an operation, according to one embodiment. An execution service determines, at 310, that resources are available to execute the operation. For example, a processor or a processor thread of the execution service may be available to execute the operation upon completing a previous operation. Upon determining that processing resources are available, at 320, the execution service requests data for the operation from an operations service module. For example, the execution service sends a polling message to the operations service module to ask for operation data. The execution service includes a name of the operation in the polling message.

At 330, a response to the polling message is received at the execution service. If data for the operation is available at the operations service module, the response includes the data. In one embodiment, the execution service may be configured to execute the operation within a certain time. In such case, the execution service includes additional parameters in the polling message to the operations service module. For example, the execution service includes an execution time parameter in the polling message. The operations service then filters data from one or more operation execution requests based on the execution time parameter. In response to the polling message, the execution service receives data of an operation matching the execution time parameter. In one embodiment, when none of the operation names included in the polling message matches a name of an available operation data, the execution service receives an empty response to the polling message.

The process to request data from an operation execution request continues at 340, where a check is performed to determine whether the received response includes operation data. In one embodiment, it may be determined that the response does not include operation data and, therefore, process 300 is discontinued.

When it is determined that the response includes operation data, at 350, the execution service acknowledges execution of the operation with the received data for the operation. The execution service sends an acknowledgement message to the operations service module. In one embodiment, the execution service includes an execution timeout parameter in the acknowledgement message to specify an expected timeout for execution of the operation.

Table 3 shows a sample of such an acknowledgement message:

TABLE 3

Acknowledge operation execution receipt

Request:
POST /operations/1234/acknowledgement
{
    "timeout": 100
}

Next, at 360, the operation is executed with the received data. Upon execution, status of the operation is determined. The execution service determines the operation execution is successful and therefore sets the operation status as successful, according to one embodiment. Similarly, when the operation execution produces an error, the execution service sets the status of the operation as error.

Upon determination of the operation execution status, at 370, the operation status is sent to the operations service module. Table 4 shows a sample of such a message to provide status from the operation execution:

TABLE 4

Providing status of an executed operation

Request:
POST /operations/1234/result
{
    "status": "SUCCESS",
    "properties": {
        "app": "webapp1",
        "url": "https://myapp.neo.ondemand.com/mywidget"
    }
}

Figure 4A:
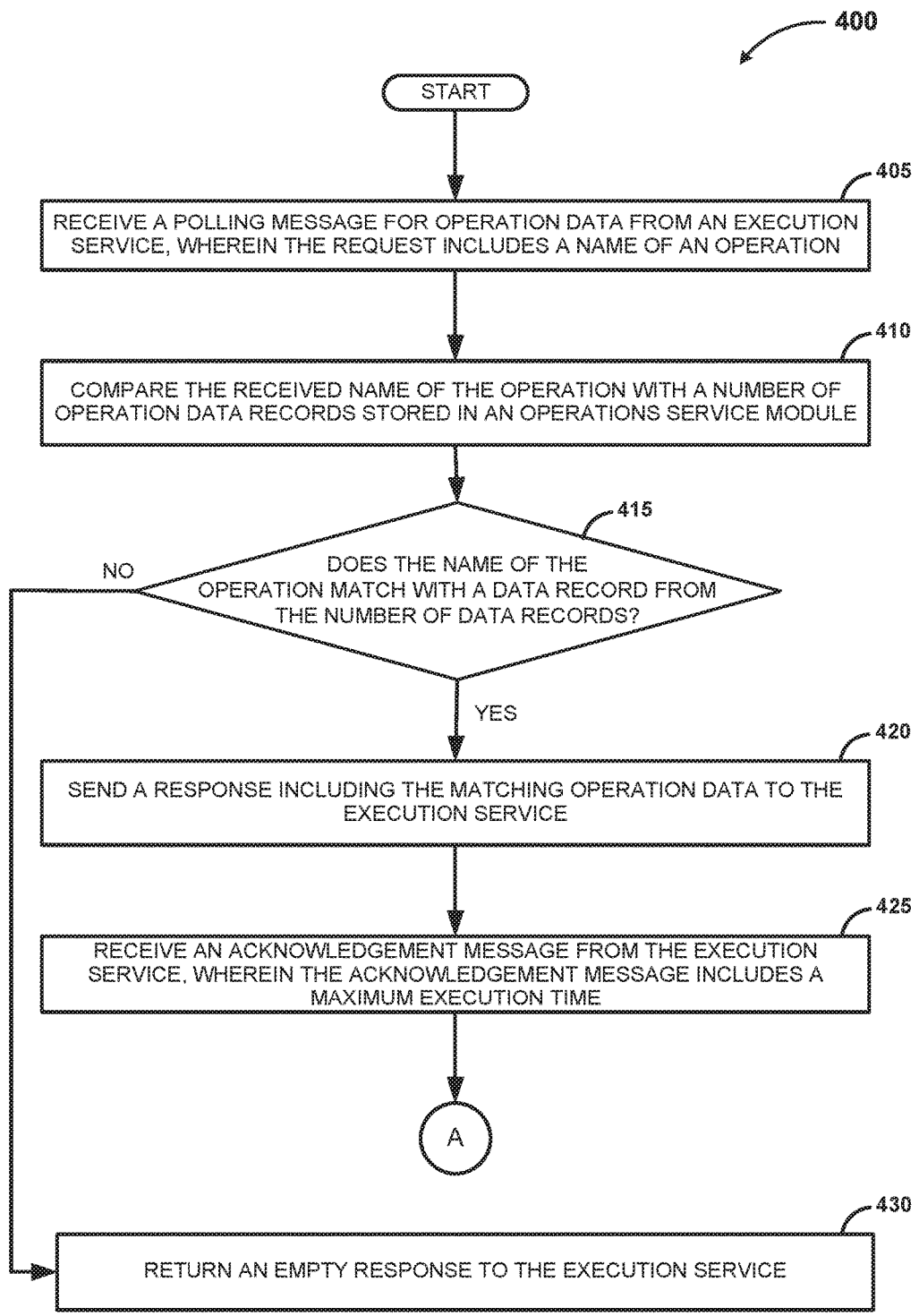
FIGS. 4A-B are flow diagrams illustrating a process to receive a polling message for an operation data and return a response to the polling message, according to one embodiment.
Figure 4B:
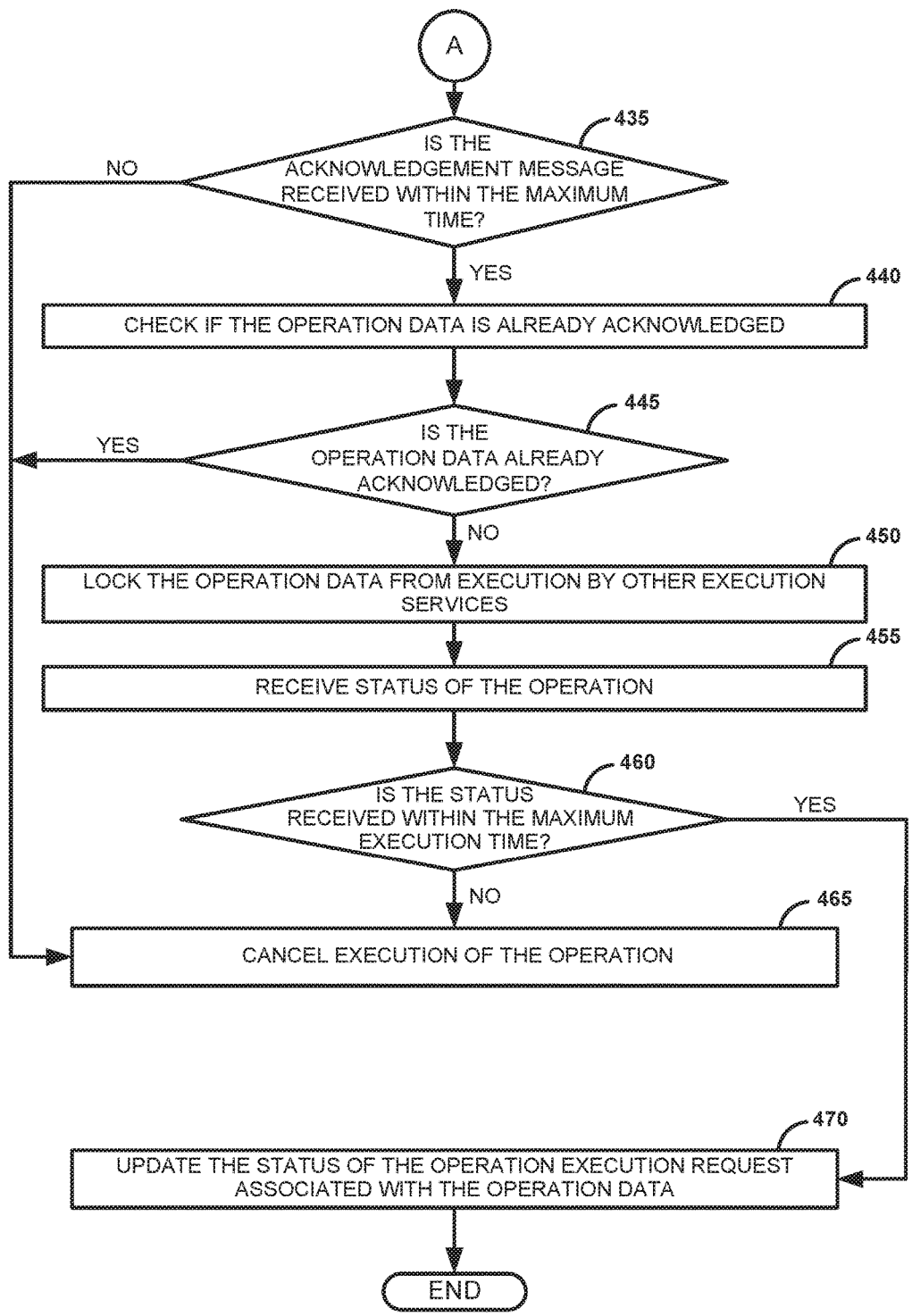

FIGS. 4A-B are flow diagrams illustrating a process 400 to receive a polling message for an operation data and return a response to the polling message, according to one embodiment. At 405 (FIG. 4A), a polling message for operation data is received. The polling message is sent from an execution service that is configured to execute an operation. The execution service may be configured to provide one or more application runtime environments. For example, an operation to create anew business role may be executed by an execution service incorporating the functionality to create roles. The request includes a name of an operation. For example, operation data with "create new role" name is requested by the execution service that is configured to create roles.

At 410, the name of the operation from the polling message is compared to names of a number of operations stored as operation data records in an operations service module. In various embodiments, the operations service module may store the number of operation data records as database tables in a repository or any generic storage device that is connected to the operations service module.

At 415, it is determined whether the name of the operation matches an operation data record from the number of operation data records. In one embodiment, the name of the operation does not match an operation data record from the number of operation data records. Therefore, at 430, an empty response is returned to the execution service.

In one embodiment, the polling message is processed in accordance with a long-polling mechanism. For example, a "wait" parameter may have value "true" in polling message. When the operations service module receives a polling message with a "wait" parameter set to "true", the polling message is processed in accordance with the long-polling mechanism. In one embodiment, the long-polling mechanism is introduced to reduce the number of messages to the operations service module. Upon determination that no operation data record from the number of operation data records matches the name included in the polling message, the operations service module adds the polling message to a pool of polling messages for later asynchronous processing. The connection between the execution service and the operations service module is blocked, waiting for a response for a predefined amount of time (e.g., one minute). If a matching operation execution request is created at the operations service module within the predefined amount of time, the operation data from the operation execution request is sent to the execution service in response to the polling message. When the predefined amount of time expires and there is no matching operation execution request created at the operations service module, the empty response is returned to the execution service.

Table 5 shows a sample of such polling message processed according to the long-polling mechanism described above:

TABLE 5

Request data of an operation via a long-polling message

Request:
GET
/operations? names=import_SFSF_roles,import_sites&statuses=
INITIAL&wait=true
Response:
{"operations":
    [{
        "metadata": {
            "id": "1234",
            "createdAt": "1414077104039",
            "updatedAt": "1414077104039",
            "createdBy": "i0999999",
            "status": "INITIAL"
        },
        "name": "import_SFSF._roles",
        "target": "extensions.service",
        "timeout": "600",
        "account": "acc1",
        "parameters": {
            "resourceTarget": "sfroles.zip",
            "resourceRepository": "jpaas.repo"
        }
    },
    {
        "metadata": {
            "id": "3244",
            "createdAt": "1414077150039",
            "updatedAt": "1414077150039",
            "createdBy": "i0888999",
            "status": "INITIAL",
        },
        "name": "import_sites",
        "target": "cloud.portal.prod",
        "timeout": "300",
        "account": "acc2",
        "parameters": {
            "resourceTarget": "html5app",
            "resourceRepository": "helium"
        }
    }
    ]
}

When it is determined that the name of the operation matches an operation data record from the number of operation data records, at 420, the matching operation data is sent to the execution service in response to the polling message. Further, at 425, an acknowledgement message is received from the execution service. The execution service acknowledges the operation data and includes an execution time parameter in the acknowledgement message, according to one embodiment. The execution time parameter specifies a maximum amount of time needed to execute the operation with the received operation data.

Next, at 435 (FIG. 4B), it is determined whether the acknowledgement message is received within a timeout specified by an acknowledgement timeout parameter. The acknowledgement timeout parameter is set by an operation requester at creation of the operation execution request. The acknowledgement time parameter specifies a deadline for the operation data from the operation execution request to be acknowledged by an execution service. When it is determined that the acknowledgement message is received outside of the specified timeout, at 465, the operation execution is canceled. In such case the status of the operation execution request is set as timed out due to the acknowledgement.

When it is determined that the acknowledgement message is received within the specified timeout, at 440, it is checked whether the operation data is already acknowledged by another execution service. For example, the acknowledgement message is accepted if the operation data is not acknowledged and the operation execution request is in status "initial". Upon successful acknowledgement, the operation execution request status is set to "processing". At 445, a determination process is started. When it is determined that the operation data is already acknowledged by another execution service, process 400 ends at 465 by canceling the operation.

Upon determining that the operation data is not acknowledged yet, at 450, the operations service module marks the operation data as locked from execution by other execution services. Thus, the operation cannot be executed by the other execution services with the same operation data. The operations service module applies steps 440-450 to guarantee the operation executed with one data record is idempotent. Next, at 455, status of the operation is received at the operations service module. The status is sent from an execution service upon executing the operation with the relevant operation data record. In one embodiment, the status of the operation execution request is set to "success" when the operation is processed by the execution service and status is received with status of the operation execution reported as successful. In contrast, when the operation is processed by the execution service and the status from the operation execution is reported as error, the operations service module sets the status of the operation execution request to "error".

Upon receiving the operation execution status in the operations service module, metadata of the operation execution request is updated with the provided status, according to one embodiment. For example, a prefix "_result" may be added to one or more attributes of the operation execution request. Thus, the operations service module provides real time status information for an operation execution request to the corresponding operation requester.

Process 400 continues at 460, where it is determined whether the status of the operation is received within the maximum amount of time specified by the execution time parameter. When it is determined that the status is received upon expiration of the maximum amount of time, at 465, the operation execution request is canceled. Status of the operation execution request is set as timed out due to processing, according to one embodiment. In contrast, when it is determined that the status of the operation is received within the maximum execution time, at 470, the status of the operation execution request at the operations service module is updated.

Described is a system and method to request execution of operations, where an operation requester and an execution service operate asynchronously to each other. One or more operation requesters create operation execution requests at an operations service module. The operations service module stores data from the operation execution requests as database records. One or more execution services request operation data from the operations service module. As soon as an operation data is received at an execution service, an acknowledgement message is returned to the operations service module to acknowledge the operation data. Upon receiving the acknowledgement message, the operations service module marks the operation data and corresponding operation execution request as locked to prevent another execution service from acknowledging the operation data. Thus, the operation with the same data is executed at most once. Upon execution of the operation, operation status is provided from the execution service to the operations service module and from the operations service module to the operation requester.

By introducing acknowledgement message and status, processing status of the operation execution request can be provided to the operation requester in real time. Further, execution status of the operation is provided asynchronously due to decoupling of the operation requester from the execution service.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
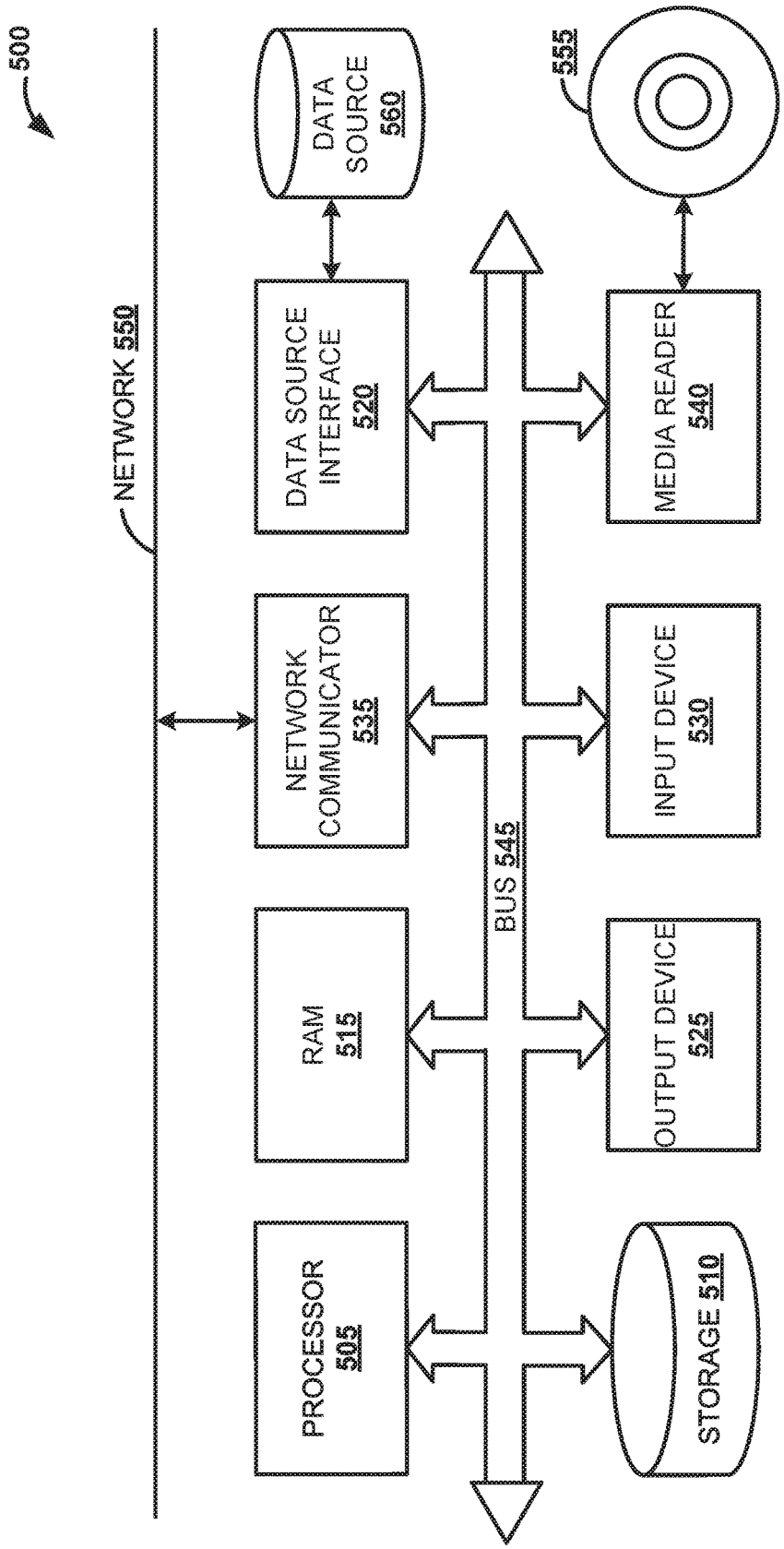
FIG. 5 is a block diagram of an exemplary computer system, according to one embodiment.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, all of the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to execute operations, the method comprising:
   receiving a polling message for an operation execution request;
   in response to the polling message, identifying an available pending operation execution request based on a status;
   sending a response to the polling message, wherein the response comprises the identified operation execution request;
   receiving an acknowledgement message that the identified operation execution request is received for execution by an execution service; and
   changing the status of the operation execution request.

2. The computer implemented method of claim 1 further comprising:
   creating the operation execution request by an operation requester; and
   storing the operation execution request in an operations service.

3. The computer implemented method of claim 1, wherein changing status of the operation execution request comprises:
   extracting a value of a maximum execution time parameter from the acknowledgement message;
   marking the operation execution request as locked for other execution services for a time period corresponding to the extracted value of the maximum execution time parameter.

4. The computer implemented method of claim 1, wherein the operation execution request comprises an acknowledgement timeout specifying a deadline for receiving the acknowledgement message for the operation execution request, and wherein the operation execution request comprises operation data.

5. The computer implemented method of claim 1, wherein receiving the polling message comprises:
   determining the operation execution request is not available;
   adding the polling message to a pool of polling messages for later asynchronous processing, wherein a connection is blocked waiting for the response;
   upon determining the operation execution request is available, processing the polling message.

6. The computer implement method of claim 1, wherein an execution of the operation execution request is performed at most once.

7. The computer implemented method of claim 1 further comprising:
   upon operation execution, receiving final status of the operation execution request;
   updating status of the operation execution request; and
   providing the updated status of the operation execution request to an operation requester.

8. A computer system to process an operation execution request, the system comprising:
   at least one processor and memory for executing program code, the program code comprising:
      a request service ha creates the operation execution request;
      an operations service module that receives a polling message for the operation execution request, identifies an available operation execution request and returns a response to the polling message, wherein the polling message comprises a name of an operation, and wherein the operations service module locks the identified operation execution request for processing when the operation execution request is acknowledged; and
      an execution service that acknowledge the operation execution request, executes the operation, and provides status of the operation, wherein the request service and the execution service operate asynchronously, and wherein the operation is executed at most once.

9. The computer system of claim 8 further comprising a memory module that stores operation data corresponding to the operation execution request, wherein the operation data is specified by the request service.

10. The computer system of claim 9, wherein the execution service sends the polling message when resources to execute the operation are available at the execution service.

11. The computer system of claim 10, wherein the operations service module identifies the operation execution request based on the name of the operation in the operation data corresponding to the operation execution request, and based on a status of the operation execution request.

12. The computer system of claim 11, wherein the execution service sends an acknowledgement message to the operations service module upon receiving the operation execution request, and wherein the acknowledgement message comprises expected time for execution of the operation.

13. The computer system of claim 12, wherein the execution service returns operation result upon executing the operation.

14. A non-transitory computer readable medium storing instructions, which when executed by at least one processor cause a computer to perform operations comprising:
   receive a polling message for an operation execution request;
   in response to the polling message, identify an available pending operation execution request based on a status;
   send a response to the polling message, wherein the response comprises the identified operation execution request;
   receive an acknowledgement message that the identified operation execution request is received for execution by an execution service;
   change the status of the operation execution request;
   upon operation execution, receive final status of the operation execution request; and
   update the status of the operation execution request.

15. The computer readable medium of claim 14 further comprising:
   create the operation execution request by an operation requester; and
   store the operation execution request in an operations service.

16. The computer readable medium of claim 14, wherein change status of the operation execution request comprises:
   extract a value of a maximum execution time parameter from the acknowledgement message;
   mark the operation execution request as locked for other execution service for a time period corresponding to the extracted value of the maximum execution time parameter.

17. The computer readable medium of claim 14, wherein the operation execution request comprises an acknowledgement timeout specifying a deadline for receiving the acknowledgement message for the operation execution request, and wherein the operation execution request comprises operation data.

18. The computer readable medium of claim 14, wherein receive the polling message from the execution service comprises:
   determine the operation execution request is not available;
   add the polling message to a pool of polling messages for later asynchronous processing, wherein a connection is blocked waiting for the response;
   upon determining the operation execution request is available, process the polling message.

19. The computer readable medium of claim 14, wherein an execution of the operation execution request is performed at most once.

20. The computer readable medium of claim 14 further comprising provide the updated status of the operation execution request to an operation requester.

* * * * *